(12) United States Patent
Zeng et al.

(10) Patent No.: US 11,988,999 B2
(45) Date of Patent: May 21, 2024

(54) TRANSACTION HARMONY DEGREE-BASED METHOD AND SYSTEM FOR TRANSACTION MATCHING BETWEEN POWER GRID AND BUILDING ENERGY

(71) Applicants: State Grid Beijing Electric Power Company, Beijing (CN); China Agricultural University, Beijing (CN); State Grid Corporation of China, Beijing (CN)

(72) Inventors: Shuang Zeng, Beijing (CN); Xianglong Li, Beijing (CN); Yifeng Ding, Beijing (CN); Anqi Liang, Beijing (CN); Mingquan Qiu, Beijing (CN); Zhao Wang, Beijing (CN); Ping Chen, Beijing (CN); Qijing Xing, Beijing (CN); Lin Ma, Beijing (CN); Dapeng Duan, Beijing (CN); Huanna Niu, Beijing (CN); Xuwu Ge, Beijing (CN); Zongsheng Li, Beijing (CN)

(73) Assignees: State Grid Beijing Electric Power Company, Beijing (CN); China Agricultural University, Beijing (CN); State Grid Corporation of China, Beijing (CN)

(*) Notice: Subject to any disclaimer, the term of this patent is extended or adjusted under 35 U.S.C. 154(b) by 383 days.

(21) Appl. No.: 17/626,125

(22) PCT Filed: Sep. 14, 2021

(86) PCT No.: PCT/CN2021/118247
§ 371 (c)(1),
(2) Date: Jan. 11, 2022

(87) PCT Pub. No.: WO2022/134666
PCT Pub. Date: Jun. 30, 2022

(65) Prior Publication Data
US 2022/0397873 A1 Dec. 15, 2022

(30) Foreign Application Priority Data

Dec. 23, 2020 (CN) .......................... 202011539884.X

(51) Int. Cl.
G05B 19/042 (2006.01)
(52) U.S. Cl.
CPC .... *G05B 19/042* (2013.01); *G05B 2219/2639* (2013.01)
(58) Field of Classification Search
USPC ........................................................ 700/295
See application file for complete search history.

(56) References Cited

U.S. PATENT DOCUMENTS

| | | | |
|---|---|---|---|
| 2011/0071690 A1* | 3/2011 | Sun ........................ | G06Q 50/06 700/286 |
| 2018/0299852 A1* | 10/2018 | Orsini .................... | G06Q 50/06 |
| 2021/0203160 A1* | 7/2021 | Ha ......................... | G06Q 10/04 |

FOREIGN PATENT DOCUMENTS

CN 109460997 A * 3/2019 ........... G06Q 20/145

* cited by examiner

*Primary Examiner* — Mohammad Ali
*Assistant Examiner* — Joshua T Sanders

(57) ABSTRACT

A transaction harmony degree-based method and system for transaction matching between a power grid and building energy. The method includes: obtaining a transaction harmony degree of a historical transaction cycle; sending, by using a blockchain, the transaction harmony degree to a corresponding building energy user, and sending a maximum compensated electricity price and an expected compensated electricity price in peak-valley regulation to all building energy users; determining, by each building energy user, a transaction-based compensated electricity price in the peak-valley regulation based on the received transaction harmony degree and the received maximum compensated electricity price and expected compensated electricity price (Continued)

in the peak-valley regulation, and feeding back the transaction-based compensated electricity price in the peak-valley regulation to a power grid; and determining, by the power grid, a building energy user that successfully performs transaction matching with the power grid.

9 Claims, 4 Drawing Sheets

TRANSACTION HARMONY DEGREE-BASED METHOD AND SYSTEM FOR TRANSACTION MATCHING BETWEEN POWER GRID AND BUILDING ENERGY

TECHNICAL FIELD

The present disclosure relates to the technical field of a power system, and in particular, to a transaction harmony degree-based method and system for transaction matching between a power grid and building energy.

BACKGROUND

With the continuous advancement of power marketization, a building energy user on a demand side is no longer a passive power consumer. In addition, double load peaks in summer and winter have been formed due to the rapid growth of seasonal peak load of a power grid. Meanwhile, as an emerging non-tamperable and non-forgeable distributed ledger technology, a blockchain technology has characteristics of decentralization, information security and transparency, data traceability, and the like, and has attracted extensive attention from various transaction systems in the power industry.

For transaction matching between the power grid and building energy in peak-valley regulation, existing documents mainly focus research on power retail transactions and distributed power bidding transactions among power transaction subjects including distributed energy power plants, power supply companies, and power consumers. At present, research on the application of the blockchain technology in the power industry focuses on use of a blockchain to build trust among a plurality of stakeholders in renewable-energy transactions and realize certification of carbon emission rights in the power industry.

Therefore, an urgent problem to be resolved is how to give full play to an ability of regulating various types of regulatory resources including building energy, and realize an efficient, fair, and transparent power transaction of a building energy user in response to a peak-valley regulation strategy of the power grid, to deal with changes of a load peak and valley of the power grid and ensure safe and economic operation of the power grid.

SUMMARY

A transaction harmony degree-based method and system for transaction matching between a power grid and building energy in the present disclosure are used to overcome the above problems in the prior art, and can use a blockchain platform as a transaction core to give full play to an ability of regulating various types of regulatory resources including building energy, and realize an efficient, fair, and transparent power transaction of a building energy user in response to a peak-valley regulation strategy of a power grid, to deal with changes of a load peak and valley of the power grid and ensuring safe and economic operation of the power grid.

The present disclosure provides a transaction harmony degree-based method for transaction matching between a power grid and building energy, including:

obtaining, by a power grid, a transaction harmony degree of a historical transaction cycle based on data that is of the historical transaction cycle within a current transaction season and stored by a building energy user in a blockchain;

sending, by the power grid by using the blockchain, the transaction harmony degree to the corresponding building energy user, and sending a maximum compensated electricity price and an expected compensated electricity price in peak-valley regulation in a current transaction cycle to all building energy users;

determining, by each building energy user, a transaction-based compensated electricity price in the peak-valley regulation in the current transaction cycle based on the received transaction harmony degree and the received maximum compensated electricity price and expected compensated electricity price in the peak-valley regulation in the current transaction cycle, and feeding back the transaction-based compensated electricity price in the peak-valley regulation in the current transaction cycle to the power grid by using the blockchain; and obtaining, by the power grid based on the transaction-based compensated electricity price in the peak-valley regulation in the current transaction cycle, an objective function required to construct a model of transaction matching between the power grid and the building energy user, and determining, based on the model of transaction matching between the power grid and the building energy user and a particle swarm optimization (PSO) algorithm, a building energy user that successfully performs transaction matching with the power grid; where the objective function is determined with an objective of maximizing a transaction harmony degree between the power grid and the building energy user and minimizing a compensation cost in the peak-valley regulation of the power grid; and the model of transaction matching between the power grid and the building energy user is composed of the objective function, a first constraint, and a second constraint.

According to the transaction harmony degree-based method for transaction matching between a power grid and building energy in the present disclosure, the obtaining, by a power grid, a transaction harmony degree of a historical transaction cycle based on data that is of the historical transaction cycle within a current transaction season and stored by a building energy user in a blockchain includes:

obtaining, by the power grid, the transaction harmony degree based on formulas (1) to (7) and the data that is of the historical transaction cycle within the current transaction season and stored by the building energy user in the blockchain;

$$F_i^k = \sigma_a F_{i,a}^k + \sigma_b F_{i,b}^k + \sigma_c F_{i,c}^k + \sigma_d F_{i,d}^k \quad (1)$$

where $F_i^k$ represents the transaction harmony degree of the historical transaction cycle, i=1, 2, ..., m, m represents a total quantity of building energy users participating in a transaction, k represents a quantity of transactions, namely, a transaction cycle number, $F_{i,a}^k$ represents an influencing factor of an achievement degree of an expected electricity quantity in the peak-valley regulation, $F_{i,b}^k$ represents an influencing factor of a satisfaction degree of a compensated electricity price in the peak-valley regulation, $F_{i,c}^k$ represents an influencing factor of a transaction frequency, $F_{i,d}^k$ represents an influencing factor of a transaction achievement degree, and $\sigma_a$, $\sigma_b$, $\sigma_c$, and $\sigma_d$ represent importance degree coefficients of the influencing factors respectively;

$$F_{i,a}^k = \omega_1 F_{i,a1}^k + \omega_2 F_{i,a2}^k, \quad (2)$$

$$F_{i,a1}^k = \sum_{j=1}^{k} \alpha^j \left( -\frac{|E_{g,i}^{peak,j} - D_{9g,i}^{peak,j}|}{D_{9j}^{peakj}} + 1 \right) \text{ and } E_{g,i}^{peak,j} > 2D_{g,i}^{peak,j} E_{g,i}^{peak,j} = 2D_{g,i}^{peak,j} \quad (3)$$

$$F_{i,a2}^k = \sum_{j=1}^{k} \beta^j \left( -\frac{|E_{g,i}^{vall,j} - D_{g,i}^{vall,j}|}{D_{g,i}^{vall,j}} + 1 \right) \text{ and } E_{g,i}^{vall,j} > 2D_{g,i}^{vall,j} E_{g,i}^{vall,j} = 2D_{g,i}^{vall,j} \quad (4)$$

where $F_{i,a1}^k$ represents an influencing factor of an achievement degree of an expected peak electricity quantity after a $k^{th}$ transaction ends, $F_{i,a2}^k$ represents an influencing factor of an achievement degree of an expected electricity quantity in valley regulation after the $k^{th}$ transaction ends, $\omega_1$ represents an importance degree coefficient of an achievement degree of an expected electricity quantity in peak regulation, $\omega_2$ represents an importance degree coefficient of the achievement degree of the expected electricity quantity in the valley regulation, $E_{gi,peak,j}$ represents an actual electricity quantity of a building energy user i in a $j^{th}$ round of peak regulation, $E_{g,i}^{vall,j}$ represents an actuaql electricity quantity of the building energy user i in a $j^{th}$ round of valley regulation, $D_{g,i}^{peak,j}$ represents an electricity quantity agreed between the power grid and the building energy user i in peak regulation in a $j^{th}$ transaction, $D_{gi,vall,j}$ represents an electricity quantity agreed between the power grid and the building energy user i in valley regulation in the $j^{th}$ transaction, and $\alpha^j$ jet $\beta^j$ represent weight coefficients of the $j^{th}$ transaction in a current transaction season $\tau$.

$$F_{i,b}^k = \sum_{j=1}^{k} \gamma^j \frac{F_{b,h}^j - F_{i,b,r}^j}{F_{b,h}^j - F_{b,e}^j} \quad (5)$$

where $F_{i,b,r}^j$ represents a transaction-based compensated electricity price of the building energy user i in peak-valley regulation in the $j^{th}$ transaction, $F_{b,h}^j$ represents a maximum compensated electricity price in the peak-valley regulation in the $j^{th}$ transaction, $F_{b,e}^j$ represents an expected compensated electricity price in the peak-valley regulation in the $j^{th}$ transaction, and $\gamma^j$ represents a weight coefficient of the $j^{th}$ transaction;

$$F_{i,c}^k = \sum_{z=1}^{S_i^k - 1} \chi^z \frac{1}{t_{i,z+1} - t_{i,z}} \quad (6)$$

where $S_i^k$ represents a total quantity of successful transactions between the power grid and the building energy user i up to the end of the $k^{th}$ transaction in the current transaction season $\tau$, $\chi^z$ represents a weight coefficient of a $z^{th}$ transaction, $t_{i,z}$ represents a corresponding transaction cycle number when the power grid and the building energy user i achieve the $z^{th}$ transaction in the current transaction season $\tau$, and $t_{i,z+1}$ represents a corresponding transaction cycle number when the power grid and the building energy user i achieve a $(z+1)^{th}$ transaction in the current transaction season $\tau$; and $$F_{i,d}^k = \sum_{j=1}^{k} \rho^j \frac{S_i^j}{S_i^j + L_i^j} \quad (7)$$

where $S_i^j$ represents a total quantity of successful transactions between the power grid and the building energy user i up to the end of the $j^{th}$ transaction in the current transaction season $\tau$, $L_i^j$ represents a total quantity of agreement violations between the power grid and the building energy user i up to the end of the $j^{th}$ transaction in the current transaction season $\tau$, and $\rho^j$ represents a weight coefficient of the $j^{th}$ transaction.

According to the transaction harmony degree-based method for transaction matching between a power grid and building energy in the present disclosure, the objective function is obtained in the following manner:

obtaining, by the power grid based on the transaction harmony degree, the transaction-based compensated electricity price of each building energy user in the peak-valley regulation in the current transaction cycle, and a formula (8), the objective function $C_F$ with a maximum transaction harmony degree between the power grid and the building energy user and a minimum compensation cost in the peak-valley regulation of the power grid:

$$C_F = \begin{cases} \max \sum_{i=1}^{m} F_i^k h_{g,i}^{k+1} \\ \min \sum_{i=1}^{m} F_{i,b,r}^{k+1} (D_{g,i}^{peak,k+1} + D_{g,i}^{vall,k+1}) h_{g,i}^{k+1} \end{cases} \quad (8)$$

where $F_{i,b,r}^{k+1}$ represents a transaction-based compensated electricity price in peak-valley regulation in a $k+1^{th}$ transaction between the power grid and a building energy user i, $D_{g,i}^{peak,k+1}$ represents an electricity quantity agreed between the power grid and the building energy user i in peak regulation in a $k+1^{th}$ transaction cycle, $D_{g,i}^{vall,k+1}$ represents an electricity quantity agreed between the power grid and the building energy user i in valley regulation in the $k+1^{th}$ transaction cycle, and $h_{g,i}^{k+1}$ represents whether the $k+1^{th}$ transaction is conducted between the power grid and the building energy user i.

According to the transaction harmony degree-based method for transaction matching between a power grid and building energy in the present disclosure, the first constraint is obtained in the following manner:

receiving an electricity quantity margin range in peak regulation in the current transaction cycle, an electricity quantity margin range in valley regulation in the current transaction cycle, and the transaction-based compensated electricity price in the peak-valley regulation that are fed back by each building energy user by using the blockchain, and obtaining, based on formulas (9) to (11), the first constraint of the model of transaction matching between the power grid and the building energy user:

$$F_{b,e}^{k+1} \leq F_{i,b,r}^{k+1} \leq F_{b,h}^{k+1} \quad (9)$$

$$D_{i,min}^{peak,k+1} \leq D_{g,i}^{peak,k+1} \leq D_{i,max}^{peak,k+1} \quad (10)$$

$$D_{i,min}^{vall,k+1} \leq D_{g,i}^{vall,k+1} \leq D_{i,max}^{vall,k+1} \quad (11)$$

where $F_{b,e}^{k+1}$ and $F_{b,h}^{k+1}$ respectively represent an expected compensated electricity price and a maximum compensated electricity price in peak-valley regulation that are sent by the power grid to all the building energy users by using the blockchain in a k+1$^{th}$ transaction cycle, $F_{i,b,r}^{k+1}$ represents a transaction-based compensated electricity price of a building energy user i in the peak-valley regulation in the k+1$^{th}$ transaction cycle, $D_{g,i}^{peak,k+1}$ represents an electricity quantity agreed between the power grid and the building energy user i in peak regulation in the k+1$^{th}$ transaction cycle, $D_{g,i}^{vall,k+1}$ represents an electricity quantity agreed between the power grid and the building energy user i in valley regulation in the k+1$^{th}$ transaction cycle, $D_{i,max}^{peak,k+1}$ represents a maximum electricity quantity of the building energy user i in the peak regulation in the k+1$^{th}$ transaction cycle, $D_{i,min}^{peak,k+1}$ represents a minimum electricity quantity of the building energy user i in the peak regulation in the k+1$^{th}$ transaction cycle, $D_{i,max}^{vall,k+1}$ represents a maximum electricity quantity of the building energy user i in the valley regulation in the k+1$^{th}$ transaction cycle, and $D_{i,min}^{vall,k+1}$ represents a minimum electricity quantity of the building energy user i in the valley regulation in the k+1$^{th}$ transaction cycle.

According to the transaction harmony degree-based method for transaction matching between a power grid and building energy in the present disclosure, the second constraint is obtained in the following manner:

obtaining, by the power grid based on an expected total electricity quantity requirement in the peak-valley regulation in the current transaction cycle and formulas (12) to (14), the second constraint of the model of transaction matching between the power grid and the building energy user:

$$\left| D_g^{peak,k+1} - \sum_{i=1}^{m} D_{g,i}^{peak,k+1} h_{g,i}^{k+1} \right| \leq \varepsilon_g^{peak,k+1} \quad (12)$$

$$\left| D_g^{vall,k+1} - \sum_{i=1}^{m} D_{g,i}^{vall,k+1} h_{g,i}^{k+1} \right| \leq \varepsilon_g^{vall,k+1} \quad (13)$$

$$h_{g,i}^{k+1} = 0, 1 \quad (14)$$

where $D_g^{peak,k+1}$ represents an expected total electricity quantity requirement in peak regulation, $D_g^{vall,k+1}$ represents an expected total electricity quantity requirement in valley regulation, $\varepsilon_g^{peak,k+1}$ represents an allowable deviation, preset by the power grid in a k+1$^{th}$ transaction cycle, between the expected total electricity quantity requirement in the peak regulation and a total electricity quantity actually agreed in the peak regulation, $\varepsilon_g^{vall,k+1}$ represents an allowable deviation, preset by the power grid in the k+1$^{th}$ transaction cycle, between the expected total electricity quantity requirement in the valley regulation and a total electricity quantity actually agreed in the valley regulation, $h_{g,i}^{k+1}$ represents whether a k+1$^{th}$ transaction is conducted between the power grid and a building energy user i, and is also a variable on which optimization solution is to be performed in the transaction matching model, $h_{g,i}^{k+1}=0$ represents that the transaction is not conducted between the power grid and the building energy user, and $h_{g,i}^{k+1}=1$ represents that the transaction is conducted between the power grid and the building energy user.

According to the transaction harmony degree-based method for transaction matching between a power grid and building energy in the present disclosure, after the determining, based on the model of transaction matching between the power grid and the building energy user, a building energy user that successfully performs transaction matching with the power grid, the method further includes:

determining, by the power grid, an agreed electricity quantity in peak regulation in the current transaction cycle and an agreed electricity quantity in valley regulation in the current transaction cycle based on the model of transaction matching between the power grid and the building energy user; and sending, by the power grid by using the blockchain, the agreed electricity quantity in the peak regulation in the current transaction cycle and the agreed electricity quantity in the valley regulation in the current transaction cycle to the building energy user with successful transaction matching.

According to the transaction harmony degree-based method for transaction matching between a power grid and building energy in the present disclosure, after the sending, by the power grid by using the blockchain, the agreed electricity quantity in the peak regulation in the current transaction cycle and the agreed electricity quantity in the valley regulation in the current transaction cycle to the building energy user with successful transaction matching, the method further includes:

determining, by the building energy user with successful transaction matching, an actual electricity quantity in the peak regulation and an actual electricity quantity in the valley regulation based on the received agreed electricity quantity in the peak regulation in the current transaction cycle and the received agreed electricity quantity in the valley regulation in the current transaction cycle; and refusing, by the building energy user with successful transaction matching, to perform transaction matching with the power grid if determining that the compensation cost, obtained through transaction matching with the power grid, in the peak-valley regulation of the power grid is lower than a preset value.

The present disclosure further provides a transaction harmony degree-based system for transaction matching between a power grid and building energy, including:

a power grid and a building energy user, where the power grid includes a first module, configured to obtain a transaction harmony degree of a historical transaction cycle based on data that is of the historical transaction cycle within a current transaction season and stored by a building energy user in a blockchain; and a second module, configured to send, by using the blockchain, the transaction harmony degree to the corresponding building energy user, and send a maximum compensated electricity price and an expected compensated electricity price in peak-valley regulation in a current transaction cycle to all building energy users;

the building energy user includes a third module, configured to determine a transaction-based compensated electricity price in the peak-valley regulation in the current transaction cycle based on the received transaction harmony degree and the received maximum compensated electricity price and expected compensated electricity price in the peak-valley regulation in the current transaction cycle, and feed back the transaction-based compensated electricity price in the peak-valley regulation in the current transaction cycle to the power grid by using the blockchain; and the power grid further includes a fourth module, configured to obtain, based on the transaction-based compensated electricity price in the peak-valley regulation in the current transaction cycle, an objective function required to construct a model of transaction matching between the power grid and the building energy user, and determine, based on the model of transaction matching between the power grid and the building energy user and a PSO algorithm, a building energy user that successfully performs transaction matching with the power grid; where the objective function is determined with an objective of maximizing a transaction harmony degree between the power grid and the building energy user and minimizing a compensation cost in the peak-valley regulation of the power grid; and the model of transaction matching between the power grid and the building energy user is composed of the objective function, a first constraint, and a second constraint.

The present disclosure further provides an electronic device, including a memory, a processor, and a computer program stored in the memory and able to run on the processor, where the processor executes the computer program to perform steps of any above-mentioned transaction harmony degree-based method for transaction matching between a power grid and building energy.

The present disclosure further provides a non-transitory computer-readable storage medium storing a computer program, where the computer program is executed by a processor to perform steps of any above-mentioned transaction harmony degree-based method for transaction matching between a power grid and building energy.

The transaction harmony degree-based method and system for transaction matching between a power grid and building energy in the present disclosure use a blockchain platform as a transaction core. Specifically, a power grid obtains a transaction harmony degree of a previous transaction cycle based on historical data stored by a building energy user in a blockchain, and sends the transaction harmony degree and maximum and expected compensated electricity prices in peak-valley regulation to the building energy user by using the blockchain. After receiving the above data from the power grid, the building energy user determines a transaction-based compensated electricity price in the peak-valley regulation, so that the power grid constructs a model of transaction matching between the power grid and the building energy user, and carries out a peak-valley regulation transaction between the power grid and the building energy user. This can realize an efficient, fair, and transparent power transaction of the building energy user in response to a peak-valley regulation strategy of the power grid, and give full play to an ability of regulating various types of regulatory resources including building energy, to deal with changes of a load peak and valley of the power grid and ensure safe and economic operation of the power grid.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person skilled in the art may still derive other drawings from these accompanying drawings without creative efforts.

DETAILED DESCRIPTION

To make the objectives, technical solutions, and advantages of the present disclosure clearer, the following clearly and completely describes the technical solutions in the present disclosure with reference to the accompanying drawings in the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

To resolve the problem in transaction matching between a power grid and a building energy user under an application background of peak-valley regulation of the power grid, the present disclosure uses a blockchain transaction framework to establish a harmony degree evaluation model of a transaction between the power grid and building energy based on proposed influencing factors of an achievement degree of an expected electricity quantity in the peak-valley regulation, a satisfaction degree of a compensated electricity price in the peak-valley regulation, a transaction frequency, and a transaction achievement degree. Therefore, a transaction harmony degree evaluation-based model of transaction matching between the power grid and the building energy user is established based on an objective function with a maximum transaction harmony degree between the power grid and the building energy and a minimum compensation cost in the peak-valley regulation of the power grid as an objective function, to obtain a number of building energy that conducts a transaction with the power grid and a corresponding electricity quantity of the building energy in the peak-valley regulation, and form a transaction harmony degree evaluation-based method for transaction matching between the power grid and the building energy.

Figure 1:
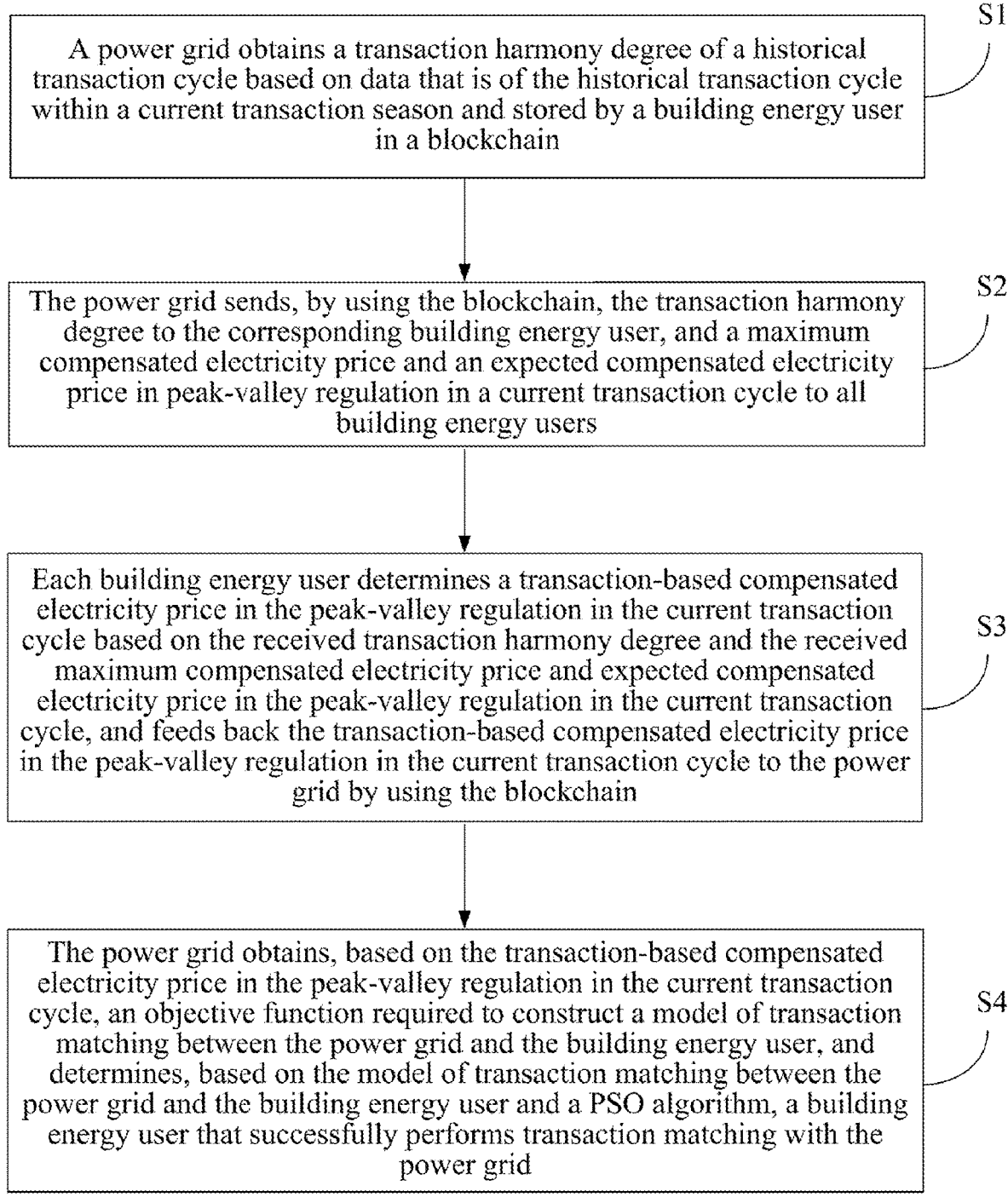
FIG. 1 is a first schematic flowchart of a transaction harmony degree-based method for transaction matching between a power grid and building energy according to the present disclosure.

FIG. 1 is a first schematic flowchart of a transaction harmony degree-based method for transaction matching between a power grid and building energy according to the present disclosure. As shown in FIG. 1, the method includes the following steps:

S1: A power grid obtains a transaction harmony degree of a historical transaction cycle based on data that is of the historical transaction cycle within a current transaction season and stored by a building energy user in a blockchain.

S2: The power grid sends, by using the blockchain, the transaction harmony degree to the corresponding building energy user, and a maximum compensated electricity price and an expected compensated electricity price in peak-valley regulation in a current transaction cycle to all building energy users.

S3: Each building energy user determines a transaction-based compensated electricity price in the peak-valley regulation in the current transaction cycle based on the received transaction harmony degree and the received maximum compensated electricity price and expected compensated electricity price in the peak-valley regulation in the current transaction cycle, and feeds back the transaction-based compensated electricity price in the peak-valley regulation in the current transaction cycle to the power grid by using the blockchain.

S4: The power grid obtains, based on the transaction-based compensated electricity price in the peak-valley regulation in the current transaction cycle, an objective function required to construct a model of transaction matching between the power grid and the building energy user, and determines, based on the model of transaction matching between the power grid and the building energy user and a PSO algorithm, a building energy user that successfully performs transaction matching with the power grid.

The objective function is determined with an objective of maximizing a transaction harmony degree between the power grid and the building energy user and minimizing a compensation cost in the peak-valley regulation of the power grid.

The model of transaction matching between power grid and the building energy user is composed of the objective function, a first constraint, and a second constraint.

Specifically, under a blockchain transaction framework, a transaction harmony degree of a historical transaction behavior (especially a transaction behavior in the current transaction season) between the power grid and the building energy user determines a transaction matching status in a future transaction cycle. Based on this, the power grid calculates a transaction harmony degree between a previous transaction cycle based on the data that is of the historical transaction cycle within the current transaction season and stored by the building energy user in the blockchain.

The power grid obtains a predicted load curve based all the connected building energy users, and obtains the maximum compensated electricity price and the expected compensated electricity price in the peak-valley regulation in the current transaction cycle in the current transaction season based on the predicted load curve.

The power grid sends, by using the blockchain, the obtained transaction harmony degree of the previous transaction cycle, and the maximum compensated electricity price and the expected compensated electricity price in the peak-valley regulation in the current transaction cycle to the building energy user.

After receiving the transaction harmony degree between the previous transaction cycle, and the maximum compensated electricity price and the expected compensated electricity price in the peak-valley regulation in the current transaction cycle, the building energy user determines the transaction-based compensated electricity price in the peak-valley regulation in the current transaction cycle, and electricity quantity margin ranges that correspond to peak regulation and valley regulation respectively, can be provided in the current transaction cycle and are evaluated based on an expected electricity use plan of the building energy user, and feeds back, to the power grid by using the blockchain, the transaction-based compensated electricity price in the peak-valley regulation in the current transaction cycle and the electricity quantity margin ranges that correspond to the peak regulation and the valley regulation respectively and can be provided in the current transaction cycle.

The power grid obtains, based on the received transaction-based compensated electricity price of the building energy user in the peak-valley regulation in the current transaction cycle and the calculated transaction harmony degree of the previous transaction cycle, the objective function required to construct the model of transaction matching between the power grid and the building energy user, and determines, based on the objective function, the building energy user that successfully performs transaction matching with the power grid.

It should be noted that the building energy user in the present disclosure may be understood as various users such as a commercial building and a residential building. This is not specifically limited in the present disclosure.

The transaction harmony degree-based method for transaction matching between a power grid and building energy in the present disclosure uses a blockchain platform as a transaction core. Specifically, a power grid obtains a transaction harmony degree between a previous transaction cycle based on historical data stored by a building energy user in a blockchain, and sends the transaction harmony degree and maximum and expected compensated electricity prices in peak-valley regulation to the building energy user by using the blockchain. After receiving the above data from the power grid, the building energy user determines a transaction-based compensated electricity price in the peak-valley regulation, so that the power grid constructs a model of transaction matching between the power grid and the building energy user, and carries out a peak-valley regulation transaction between the power grid and the building energy user. This can realize an efficient, fair, and transparent power transaction of the building energy user in response to a peak-valley regulation strategy of the power grid, and give full play to an ability of regulating various types of regulatory resources including building energy, to deal with changes of a load peak and valley of the power grid and ensure safe and economic operation of the power grid.

Further, in an embodiment, the step S1 may specifically include the following step:

S11: The power grid obtains the transaction harmony degree based on formulas (1) to (7) and the data that is of the historical transaction cycle within the current transaction season and stored by the building energy user in the blockchain:

$$F_i^k = \sigma_a F_{i,a}^k + \sigma_b F_{i,b}^k + \sigma_c F_{i,c}^k + \sigma_d F_{i,d}^k \tag{1}$$

where $F_i^k$ represents the transaction harmony degree of the historical transaction cycle, i=1, 2, ..., m, m represents a total quantity of building energy users participating in a transaction, k represents a quantity of transactions, namely, a transaction cycle number, $F_{i,a}^k$ represents an influencing factor of an achievement degree of an expected electricity quantity in the peak-valley regulation, $F_{i,b}^k$ represents an influencing factor of a satisfaction degree of a compensated electricity price in the peak-valley regulation, $F_{i,c}^k$ represents an influencing factor of a transaction frequency, $F_{i,d}^k$ represents an influencing factor of a transaction achievement degree, and $\sigma_a$, $\sigma_b$, $\sigma_c$, and $\sigma_d$ represent importance degree coefficients of the influencing factors respectively;

$$F_{i,a}^k = \omega_1 F_{i,a1}^k + \omega_2 F_{i,a2}^k \tag{2}$$

$$F_{i,a1}^k = \sum_{j=1}^{k} \alpha^j \left( -\frac{|E_{g,i}^{peak,j} - D_{g,i}^{peak,j}|}{D_{g,i}^{peak,j}} + 1 \right) \text{ and} \tag{3}$$

$$E_{g,i}^{peak,j} > 2D_{g,i}^{peak,j}, E_{g,i}^{peak,j} = 2D_{g,i}^{peak,j}$$

$$F_{i,a2}^k = \sum_{j=1}^{k} \beta^j \left( -\frac{|E_{g,i}^{vall,j} - D_{g,i}^{vall,j}|}{D_{g,i}^{vall,j}} + 1 \right) \text{ and} \tag{4}$$

$$E_{g,i}^{vall,j} > 2D_{g,i}^{vall,j}, E_{g,i}^{vall,j} = 2D_{g,i}^{vall,j}$$

where $F_{i,a1}{}^k$ represents an influencing factor of an achievement degree of an expected peak electricity quantity after a $k^{th}$ transaction ends, $F_{i,a2}{}^k$ represents an influencing factor of an achievement degree of an expected electricity quantity in valley regulation after the $k^{th}$ transaction ends, $\omega_1$ represents an importance degree coefficient of an achievement degree of an expected electricity quantity in peak regulation, $\omega_2$ represents an importance degree coefficient of the achievement degree of the expected electricity quantity in the valley regulation, $E_{g,i}{}^{peak,j}$ represents an actual electricity quantity of a building energy user i in a $j^{th}$ round of peak regulation, $E_{g,i}{}^{vall,j}$ represents an actual electricity quantity of the building energy user i in a $j^{th}$ round of valley regulation, $D_{g,i}{}^{peak,j}$ represents an electricity quantity agreed between the power grid and the building energy user i in peak regulation in a $j^{th}$ transaction, $D_{g,i}{}^{vall,j}$ represents an electricity quantity agreed between the power grid and the building energy user i in valley regulation in the $j^{th}$ transaction, and $\alpha^j$ jet $\beta^j$ represent weight coefficients of the $j^{th}$ transaction in a current transaction season $\tau$;

$$F_{i,b}^k = \sum_{j=1}^{k} \gamma^j \frac{F_{b,h}^j - F_{i,b,r}^j}{F_{b,h}^j - F_{b,e}^j} \quad (5)$$

where $F_{i,b,r}{}^j$ represents a transaction-based compensated electricity price of the building energy user i in peak-valley regulation in the $j^{th}$ transaction, $F_{b,h}{}^j$ represents a maximum compensated electricity price in the peak-valley regulation in the $j^{th}$ transaction, $F_{b,e}{}^j$ represents an expected compensated electricity price in the peak-valley regulation in the $j^{th}$ transaction, and $\gamma^j$ represents a weight coefficient of the $j^{th}$ transaction;

$$F_{i,c}^k = \sum_{z=1}^{S_i^k - 1} \chi^z \frac{1}{t_{i,z+1} - t_{i,z}} \quad (6)$$

where $S_i{}^k$ represents a total quantity of successful transactions between the power grid and the building energy user i up to the end of the $k^{th}$ transaction in the current transaction season $\tau$, $\chi^z$ represents a weight coefficient of a $z^{th}$ transaction, $t_{i,z}$ represents a corresponding transaction cycle number when the power grid and the building energy user i achieve the $z^{th}$ transaction in the current transaction season $\tau$, and $t_{i,z+1}$ represents a corresponding transaction cycle number when the power grid and the building energy user i achieve a $(z+1)^{th}$ transaction in the current transaction season $\tau$; and $$F_{i,d}^k = \sum_{j=1}^{k} \rho^j \frac{S_i^j}{S_i^j + L_i^j} \quad (7)$$

where $S_i{}^j$ represents a total quantity of successful transactions between the power grid and the building energy user i up to the end of the $j^{th}$ transaction in the current transaction season $\tau$, $L_i{}^j$ represents a total quantity of agreement violations between the power grid and the building energy user i up to the end of the $j^{th}$ transaction in the current transaction season $\tau$, and $\rho^j$ represents a weight coefficient of the $j^{th}$ transaction.

The present disclosure considers the influencing factor $F_{i,a}{}^k$ of the achievement degree of the expected electricity quantity in the peak-valley regulation, the influencing factor $F_{i,b}{}^k$ of the satisfaction degree of the compensated electricity price in the peak-valley regulation, the influencing factor $F_{i,c}{}^k$ of the transaction frequency, and the influencing factor $F_{i,d}{}^k$ of the transaction achievement degree, and establishes a harmony degree evaluation model of a transaction between the power grid and building energy based on the importance degree coefficient $\sigma_a$ of the influencing factor of the achievement degree of the expected electricity quantity in the peak-valley regulation, the importance degree coefficient $\sigma_b$ of the influencing factor of the satisfaction degree of the compensated electricity price in the peak-valley regulation, the importance degree coefficient $\sigma_c$ of the influencing factor of the transaction frequency, the importance degree coefficient $\sigma_d$ of the influencing factor of the transaction achievement degree, and the formula (1).

It should be noted that $\sigma_a + \sigma_b + \sigma_c + \sigma_d = 1$ in the present disclosure. Because the influencing factor of the achievement degree of the expected electricity quantity in the peak-valley regulation and the influencing factor of the satisfaction degree of the compensated electricity price in the peak-valley regulation are directly related to economic benefits of the power grid, $\sigma_a$ and $\sigma_b$ are larger, while $\sigma_c$ and $\sigma_d$ are smaller.

Once building energy participating in the peak-valley regulation of the power grid reaches an electricity quantity transaction agreement with the power grid in the peak-valley regulation, when an actual electricity quantity of the building energy in the peak or valley regulation deviates from an agreed electricity quantity in the peak-valley regulation, an expected peak-load shifting plan of the power grid is affected no matter whether the actual electricity quantity in the peak-valley regulation is less than or more than the agreed electricity quantity in the peak-valley regulation. This may cause a new load peak or load valley, and make an actual effect of the peak-valley regulation deviate from an expectation of the power grid. Therefore, the power grid expects the actual electricity quantity of the building energy in the peak-valley regulation to maximally approximate the agreed regulated electricity quantity. Based on this, it is set that when the actual electricity quantity of the building energy in the peak-valley regulation is equal to or greater than twice the agreed regulated electricity quantity, an influencing factor of an achievement degree of an expected electricity quantity of the building energy in the peak-valley regulation is 0, and an achievement degree function of the expected electricity quantity in the peak-valley regulation is constructed, as shown in FIG. 2.

Figure 2:
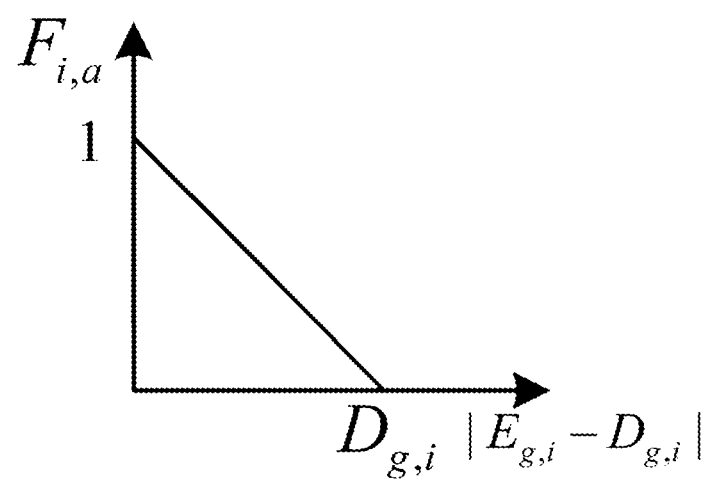
FIG. 2 is a schematic structural diagram of an achievement degree of an expected electricity quantity in peak-valley regulation according to the present disclosure.

In FIG. 2, the ordinate $F_{i,a}$ represents an influencing factor of an achievement degree of an expected electricity quantity of the building energy user i in peak-valley regulation in a transaction, the abscissa $|E_{g,i} - D_{g,i}|$ represents a deviation between an actual electricity quantity of the building energy user i in the peak-valley regulation and an agreed electricity quantity of the building energy user i in the peak-valley regulation, $E_{g,i}$ represents the actual electricity quantity of the building energy user i in the peak-valley regulation, and $D_{g,i}$ represents the electricity quantity agreed between the building energy user i and the power grid in the peak-valley regulation.

An influencing factor model of the achievement degree of the expected electricity quantity in the peak-valley regulation is constructed for the power grid and the building energy based on the above achievement degree function of the expected electricity quantity in the peak-valley regulation and the formulas (2) to (4).

It should be noted that, in the present disclosure, $\omega_1$ and $\omega_2$ represent the importance degree coefficients of the achievement degrees of the expected electricity quantities in the peak and valley regulation respectively, and $\omega_1+\omega_2=1$. Generally, the power grid pays more attention to the achievement degree of the expected electricity quantity in the peak regulation. Therefore, $\omega_1>\omega_2$. $\alpha^j$ and $\beta^j$ are the weight coefficients of the $j^{th}$ transaction in the current transaction season $\tau$, $\Sigma\alpha^j=1$, and $\Sigma\beta^j=1$. When $D_{g,i}^{peak,j}=0$, $\alpha^j=0$. When $D_{g,i}^{vall,j}=0$, $\beta^j=0$. In addition, a transaction farther away from current transaction time has a smaller coefficient, and a transaction closer to the current transaction time has a larger coefficient.

Under the blockchain transaction framework, the building energy participating in the peak-valley regulation of the power grid can easily make an autonomous transaction quotation for a compensated electricity price with the power grid, and record information about an achieved transaction in a block. To reflect the satisfaction degree of the power grid for the compensated electricity price that is in the peak-valley regulation and is reported by the building energy to the power grid, an influencing factor model of the satisfaction degree of the compensated electricity price in the peak-valley regulation is established based on the formula (5).

It should be noted that, in the present disclosure, $\gamma^j$ represents the weight coefficient of the $j^{th}$ transaction, $\Sigma\gamma^j=1$, and a transaction farther away from the current transaction time has a smaller coefficient and a transaction closer to the current transaction time has a larger coefficient.

The influencing factor of the transaction frequency of the building energy user and the power grid represents enthusiasm of the building energy user participating in the peak-valley regulation of the power grid. The power grid hopes that the building energy user conducts a transaction with the power grid more frequently.

During the transaction conducted between the power grid and the building energy based on a blockchain platform, $h_{g,i}^j$ is used to represent whether the $j^{th}$ transaction is conducted between the power grid and the building energy user i, $h_{g,i}^j=0$ is used to represent that the transaction is not conducted between the power grid and the building energy user i, and $h_{g,i}^j=1$ is used to represent that the transaction is conducted between the power grid and the building energy user i. Based on this, a transaction cycle recording function $t_i^j=f(i,j)$ of the building energy user i is constructed. When the $j^{th}$ transaction is not conducted between the power grid and the building energy user i (namely, $h_{g,i}^j=0$), $t_i^j=0$ is set. When the $j^{th}$ transaction is conducted between the power grid and the building energy user i (namely, $h_{g,i}^j=1$), $t_i^j$ is assigned a transaction cycle number j of the current transaction, namely, $t_i^j=f(i,j)=jh_{g,i}^j$.

$t_i^j$ (j=1, 2, . . . , k) is arranged in an ascending order, and k represents a quantity of transactions that have been completed currently by the power grid (namely, the transaction cycle number). A $z^{th}$ nonzero number in arranged $t_i^j$ (j=1, 2, . . . , k) is denoted as $t_{i,z}$, representing the corresponding transaction cycle number when the power grid and the building energy user i achieve the $z^{th}$ transaction in the current transaction season $\tau$. In addition, the quantity $S_i^k$ of successful transactions between the power grid and the building energy user i up to the end of the $k^{th}$ transaction in the current transaction season $\tau$ is the number of nonzero value in $h_{g,i}^j$ (j=1, 2, . . . , k), namely, $$S_i^k = \sum_{j=1}^{k} h_{g,i}^j.$$

An evaluation model of the influencing factor of the transaction frequency is established by substituting the corresponding transaction cycle numbers when the power grid and the building energy user i achieve the z and (z+1) transactions and the quantity $S_i^k$ of successful transactions between the power grid and the building energy user i up to the end of the $k^{th}$ transaction in the current transaction season $\tau$ into the formula (6).

In the current transaction season $\tau$, S and L represent the quantities of successful transactions and agreement violations between the building energy and the power grid respectively. The influencing factor of the transaction achievement degree is calculated by substituting S and L into the formula (7). It should be noted that $\Sigma\rho^j=1$, and a transaction farther away from the current transaction time has a smaller coefficient and a transaction closer to the current transaction time has a larger coefficient.

When constructing the transaction harmony degree evaluation-based model of transaction matching between the power grid and the building energy, the transaction harmony degree-based method for transaction matching between a power grid and building energy in the present disclosure fully considers the influencing factors of the achievement degree of the expected electricity quantity in the peak-valley regulation, the satisfaction degree of the compensated electricity price in the peak-valley regulation, the transaction frequency, and the transaction achievement degree, and improves efficiency of transaction matching between the power grid and the building energy user, and enthusiasm of the building energy user participating in peak-load shifting regulation of the power grid.

Further, in an embodiment, the step S4 may specifically include the following step:

S41: The power grid obtains, based on the transaction harmony degree, the transaction-based compensated electricity price of each building energy user in peak-valley regulation in the current transaction cycle, and a formula (8), the objective function $C_F$ with a maximum transaction harmony degree between the power grid and the building energy user and a minimum compensation cost in the peak-valley regulation of the power grid:

$$C_F = \begin{cases} \max \sum_{i=1}^{m} F_i^k h_{g,i}^{k+1} \\ \min \sum_{i=1}^{m} F_{i,b,r}^{k+1}(D_{g,i}^{peak,k+1} + D_{g,i}^{vall,k+1}) h_{g,i}^{k+1} \end{cases} \quad (8)$$

where $F_{i,b,r}^{k+1}$ represents a transaction-based compensated electricity price in peak-valley regulation in a $k+1^{th}$ transaction between the power grid and a building energy user i, $D_{g,i}^{peak,k+1}$ represents an electricity quantity agreed between the power grid and the building energy user i in peak regulation in a $k+1^{th}$ transaction cycle, $D_{g,i}^{vall,k+1}$ represents an electricity quantity agreed between the power grid and the building energy user i in valley regulation in the $k+1^{th}$ transaction cycle, $h_{g,i}^{k+1}$ represents whether the $k+1^{th}$ transaction is conducted between the power grid and the building energy user i, and $h_{g,i}^{k+1}$ represents that the power grid and the building energy user i successfully performs matching for the k+1$^{th}$ transaction.

Specifically, in a transaction matching stage, the power grid distributes information about a total electricity quantity required by the power grid in the peak-valley regulation, and acceptable maximum and expected compensated electricity prices in the peak-valley regulation in the current transaction to a blockchain network, and distributes a corresponding transaction harmony degree to each building energy.

Each building energy user reports, to the power grid by using the blockchain platform, its own transaction-based compensated electricity price in the peak-valley regulation and an electricity quantity margin range that can be provided by the building energy user.

Based on a harmony degree index of a transaction between the power grid and each building energy in the current transaction season and the objective function with the maximum transaction harmony degree and the minimum compensation cost in the peak-valley regulation of the power grid, as shown in the formula (8), the power grid constructs a model of a new round (namely, a (k+1)$^{th}$ round in the current transaction season τ) of transaction matching between the power grid and the building energy.

Based on the objective function with the maximum transaction harmony degree in the historical transaction behavior and the minimum compensation cost in the peak-valley regulation of the power grid, the transaction harmony degree-based method for transaction matching between a power grid and building energy in the present disclosure establishes the transaction harmony degree evaluation-based model of transaction matching between the power grid and the building energy, to promote the building energy user to actively respond to the peak-load shifting regulation of the power grid based on the historical transaction harmony degree and the compensation cost in the peak-valley regulation of the power grid, deal with changes of a load peak and valley of the power grid, and ensure safe and economic operation of the power grid.

Further, in an embodiment, the step S4 may specifically include the following step:

S42: Receive an electricity quantity margin range in peak regulation in the current transaction cycle, an electricity quantity margin range in valley regulation in the current transaction cycle, and the transaction-based compensated electricity price in the peak-valley regulation that are fed back by each building energy user by using the blockchain, and obtain, based on formulas (9) to (11), the first constraint of the model of transaction matching between the power grid and the building energy user:

$$F_{b,e}^{k+1} \leq F_{i,b,r}^{k+1} \leq F_{b,h}^{k+1} \quad (9)$$

$$D_{i,min}^{peak,k+1} \leq D_{g,i}^{peak,k+1} \leq D_{i,max}^{peak,k+1} \quad (10)$$

$$D_{i,min}^{vall,k+1} \leq D_{g,i}^{vall,k+1} \leq D_{i,max}^{vall,k+1} \quad (11)$$

where $F_{b,e}^{k+1}$ and $F_{b,h}^{k+1}$ respectively represent an expected compensated electricity price and a maximum compensated electricity price in peak-valley regulation that are sent by the power grid to all the building energy users by using the blockchain in a k+1$^{th}$ transaction cycle, $F_{i,b,r}^{k+1}$ represents a transaction-based compensated electricity price of a building energy user i in the peak-valley regulation in the k+1$^{th}$ transaction cycle, $D_{g,i}^{peak,k+1}$ represents an electricity quantity agreed between the power grid and the building energy user i in peak regulation in the k+1$^{th}$ transaction cycle, $D_{g,i}^{vall,k+1}$ represents an electricity quantity agreed between the power grid and the building energy user i in valley regulation in the k+1$^{th}$ transaction cycle, $D_{i,max}^{peak,k+1}$ represents a maximum electricity quantity of the building energy user i in the peak regulation in the k+1$^{th}$ transaction cycle, $D_{i,min}^{peak,k+1}$ represents a minimum electricity quantity of the building energy user i in the peak regulation in the k+1$^{th}$ transaction cycle, $D_{i,max}^{vall,k+1}$ represents a maximum electricity quantity of the building energy user i in the valley regulation in the k+1$^{th}$ transaction cycle, and $D_{i,min}^{vall,k+1}$ represents a minimum electricity quantity of the building energy user i in the valley regulation in the k+1$^{th}$ transaction cycle.

In an embodiment, the step S4 may further include the following step:

S43: The power grid obtains, based on an expected total electricity quantity requirement in the peak-valley regulation in the current transaction cycle and formulas (12) to (14), the second constraint of the model of transaction matching between the power grid and the building energy user:

$$\left| D_g^{peak,k+1} - \sum_{i=1}^{m} D_{g,i}^{peak,k+1} h_{g,i}^{k+1} \right| \leq \varepsilon_g^{peak,k+1} \quad (12)$$

$$\left| D_g^{vall,k+1} - \sum_{i=1}^{m} D_{g,i}^{vall,k+1} h_{g,i}^{k+1} \right| \leq \varepsilon_g^{vall,k+1} \quad (13)$$

$$h_{g,i}^{k+1} = 0, 1 \quad (14)$$

where $D_g^{peak,k+1}$ represents an expected total electricity quantity requirement in peak regulation, $D_g^{vall,k+1}$ represents an expected total electricity quantity requirement in valley regulation, $\varepsilon_g^{peak,k+1}$ represents an allowable deviation, preset by the power grid in a k+1$^{th}$ transaction cycle, between the expected total electricity quantity requirement in the peak regulation and a total electricity quantity actually agreed in the peak regulation, $\varepsilon_g^{vall,k+1}$ represents an allowable deviation, preset by the power grid in the k+1$^{th}$ transaction cycle, between the expected total electricity quantity requirement in the valley regulation and a total electricity quantity actually agreed in the valley regulation, $h_{g,i}^{k+1}$ represents whether a k+1$^{th}$ transaction is conducted between the power grid and a building energy user i, and is also a variable on which optimization solution is to be performed in the transaction matching model, $h_{g,i}^{k+1}=0$ represents that the transaction is not conducted between the power grid and the building energy user, and $h_{g,i}^{k+1}=1$ represents that the transaction is conducted between the power grid and the building energy user.

In an embodiment, after the step S43, the method further includes the following steps:

S44: The power grid determines an agreed electricity quantity in peak regulation in the current transaction cycle and an agreed electricity quantity in valley regulation in the current transaction cycle based on the model of transaction matching between the power grid and the building energy user.

S45: The power grid sends, by using the blockchain, the agreed electricity quantity in the peak regulation in the current transaction cycle and the agreed electricity quantity in the valley regulation in the current transaction cycle to the building energy user with successful transaction matching.

Specifically, the constraints of the objective function $C_F$ are determined based on the formulas (9) to (14), a number of a building energy user that conducts a transaction with the power grid is obtained based on the PSO algorithm, and the agreed electricity quantity $D_{g,i}^{peak,k+1}$ in the peak regulation in the current transaction cycle and the agreed electricity quantity $D_{g,i}^{vall,k+1}$ in the valley regulation in the current transaction cycle are determined.

The power grid sends, by using the blockchain, the number of the building energy user that conducts a transaction with the power grid, the agreed electricity quantity $D_{g,i}^{peak,k+1}$ in the peak regulation in the current transaction cycle, and the agreed electricity quantity $D_{g,i}^{vall,k+1}$ in the valley regulation in the current transaction cycle to the corresponding building energy user.

The PSO algorithm simulates a bird in a bird flock by designing a massless particle, uses a building energy user as a particle and all building energy users as a particle swarm, assigns each building energy user two attributes: speed and position. The speed represents a movement speed and the position represents a movement direction. Each building energy user separately searches for an optimal solution in search space, denotes the optimal solution as a current individual extremum, shares the individual extremum with other particles in the whole particle swarm, finds an optimal individual extremum, and uses the optimal individual extremum as a current global optimal solution of the whole particle swarm. Each building energy user in the particle swarm adjusts its own speed and position based on the current individual extremum found by the building energy user and the current global optimal solution shared in the whole particle swarm, and finally the number of the building energy user that conducts a transaction with the power grid is obtained.

The transaction harmony degree-based method for transaction matching between a power grid and building energy in the present disclosure can quickly obtain, based on the PSO algorithm, the building energy user that conducts a transaction with the power grid. In this way, the power grid can determine the agreed electricity quantity in the peak regulation in the current transaction cycle and the agreed electricity quantity in the valley regulation in the current transaction cycle in time based on the changes of the load peak and valley of the power grid, so that the building energy user that successfully performs transaction matching with the power grid actively responds to a peak-load shifting strategy of the power grid based on the agreed electricity quantity in the peak regulation and the agreed electricity quantity in the valley regulation, to ensure safe operation of the power grid.

Further, in an embodiment, after the step S45, the method may specifically include the following step:

S46: The building energy user with successful transaction matching determines an actual electricity quantity in the peak regulation and an actual electricity quantity in the valley regulation based on the received agreed electricity quantity in the peak regulation in the current transaction cycle and the received agreed electricity quantity in the valley regulation in the current transaction cycle.

The building energy user with successful transaction matching refuses to perform transaction matching with the power grid if determining that the compensation cost, obtained through transaction matching with the power grid, in the peak-valley regulation of the power grid is lower than a preset value.

Specifically, the building energy user i that reaches a peak-valley regulation transaction agreement with the power grid executes the transaction, completes the peak-valley regulation within a transaction day, and feeds back, by using the blockchain, the actual electricity quantity $E_{g,i}^{peak,k+1}$ in the peak regulation performed by the building energy user i and the actual electricity quantity $E_{g,i}^{vall,k+1}$ in the valley regulation performed by the building energy user i. Alternatively, when determining that the compensation cost obtained by participating in the peak-valley regulation of the power grid cannot satisfy an interest demand of the building energy user i, the building energy user i violates the agreement, refuses to perform transaction matching with the power grid, and feeds back $h_{g,i}^{k+1}=0$ to the power grid by using the blockchain.

Further, in an embodiment, the power grid ends transaction matching with the building energy user when determining that a total quantity of transaction cycles in the current transaction season reaches a preset maximum quantity of transactions.

Figure 3:
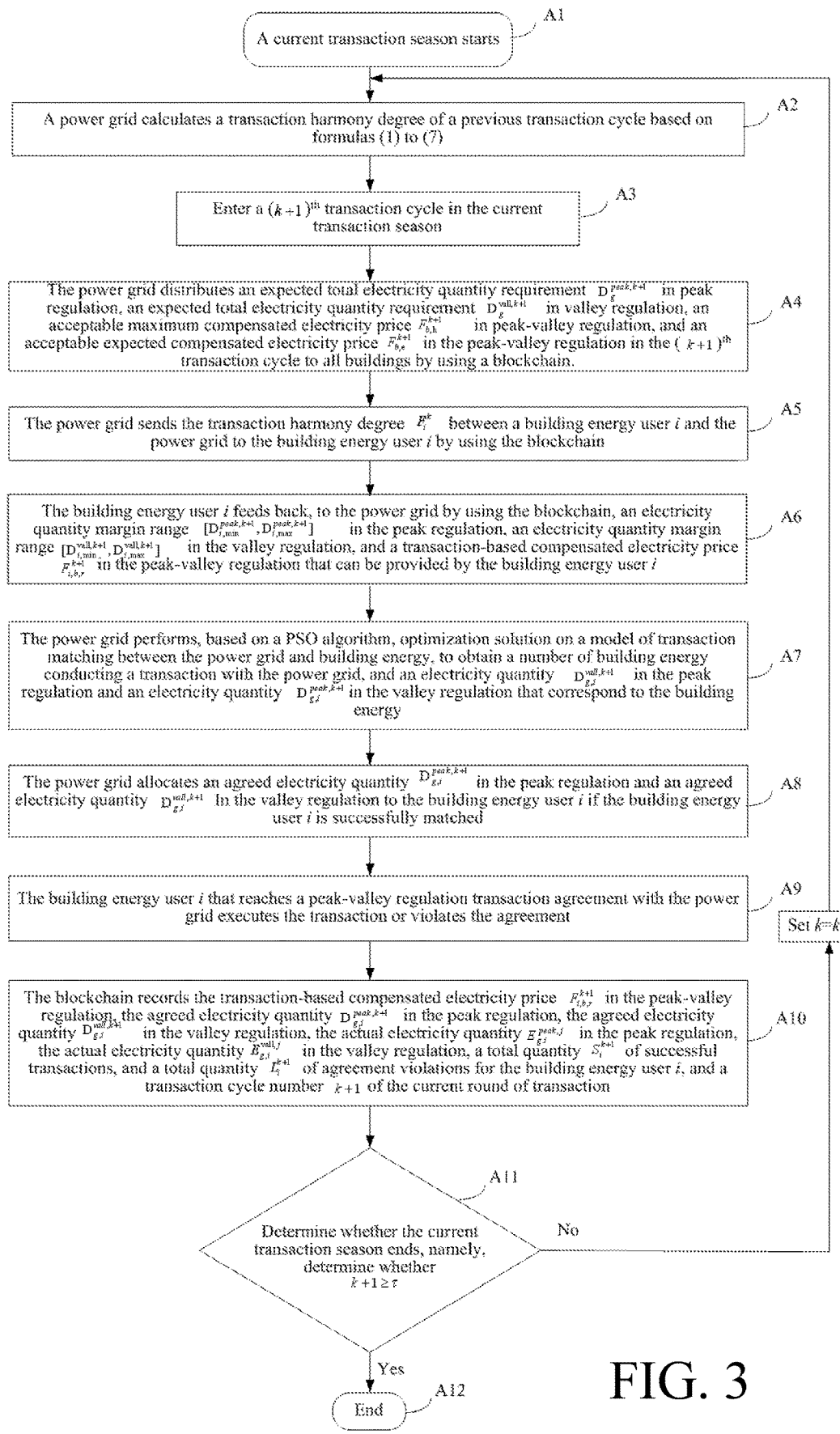
FIG. 3 is a second schematic flowchart of a transaction harmony degree-based method for transaction matching between a power grid and building energy according to the present disclosure.

Specifically, it is assumed that the total quantity of transaction cycles in the current transaction season is $\tau$ and a number of the current transaction cycle is k+1. Based on the above embodiments, a process of transaction matching between the power grid and the building energy user is described with reference to FIG. 3. The power grid and the building energy user can realize transaction matching by performing the following steps A1 to A10.

A1: A current transaction season starts.

A2: Update, based on the formulas (1) to (7), a transaction harmony degree $F_i^k$ of the building energy user i after a historical transaction cycle ends.

A3: Enter a k+1$^{th}$ transaction cycle in the current transaction season $\tau$.

A4: The power grid distributes an expected total electricity quantity requirement $D_g^{peak,k+1}$ in peak regulation, an expected total electricity quantity requirement $D_g^{peak,k+1}$ in valley regulation, an acceptable maximum compensated electricity price $F_{b,h}^{k+1}$ in peak-valley regulation, and an acceptable expected compensated electricity price $F_{b,e}^{k+1}$ in the peak-valley regulation in the k+1$^{th}$ transaction cycle to all the building energy users by using the blockchain platform.

A5: The power grid sends the transaction harmony degree $F_i^k$ to the corresponding building energy user i by using the blockchain.

A6: The building energy user i feeds back, to the power grid by using the blockchain, an electricity quantity margin range $[D_{i,min}^{peak,k+1}, D_{i,max}^{peak,k+1}]$ in the peak regulation, an electricity quantity margin range $[D_{i,min}^{vall,k+1}, D_{i,max}^{vall,k+1}]$ in the valley regulation, and a transaction-based compensated electricity price $F_{i,b,r}^{k+1}$ in the peak-valley regulation that can be provided by the building energy user i.

A7: The power grid performs, based on the PSO algorithm, optimization solution on the model of transaction matching between the power grid and the building energy, to obtain a number of building energy conducting a transaction with the power grid, and an electricity quantity $D_{g,i}^{peak,k+1}$ in the peak regulation and an electricity quantity $D_{g,i}^{vall,k+1}$ in the valley regulation that correspond to the building energy.

A8: The power grid allocates an agreed electricity quantity $D_{g,i}^{peak,k+1}$ in the peak regulation and an agreed electricity quantity $D_{g,i}^{vall,k+1}$ in the valley regulation to the building energy user i if the building energy user i is successfully matched.

Specifically, the step A8 further includes: returning a transaction rejection message to the building energy user i ($h_{g,i}^{k+1}=0$) if the building energy user i is not matched, and setting the agreed electricity quantity in the peak regulation and the agreed electricity quantity in the valley regulation that correspond to the building energy user i to 0.

A9: The building energy user i that reaches a peak-valley regulation transaction agreement with the power grid executes the transaction or violates the agreement.

Specifically, the building energy user i that reaches the peak-valley regulation transaction agreement with the power grid executes the transaction (that is, completes the peak-valley regulation within a transaction day, and feeds back, by using the blockchain, an actual electricity quantity $E_{g,i}^{peak,k+1}$ in the peak regulation performed by the building energy user i and an actual electricity quantity $E_{g,i}^{vall,k+1}$ in the valley regulation performed by the building energy user i); or violates the agreement (that is, determines that a compensation cost obtained by participating in the peak-valley regulation of the power grid cannot satisfy an interest demand of the building energy user i, and feeds back $h_{g,i}^{k+1}=0$ to the blockchain).

A10: The blockchain records the agreed transaction-based compensated electricity price $F_{i,b,r}^{k+1}$ in the peak-valley regulation, the agreed electricity quantity $D_{g,i}^{peak,k+1}$ in the peak regulation, the agreed electricity quantity $D_{g,i}^{vall,k+1}$ in the valley regulation, the actual electricity quantity $E_{g,i}^{peak,k+1}$ in the peak regulation, the actual electricity quantity $E_{g,i}^{vall,k+1}$ in the valley regulation, a total quantity $S_i^{k+1}$ of successful transactions, and a total quantity $L_i^{k+1}$ of agreement violations in the k+1$^{th}$ transaction cycle that are of the building energy user i, and a transaction cycle number k+1 of the current round of transaction.

A11: Determine whether the current transaction season ends, namely, determine whether k+1≥τ. If the current transaction season does not end, set k=k+1 and return to perform the step A2. If the current transaction season ends, perform step A12.

A12: End.

According to the transaction harmony degree-based method for transaction matching between a power grid and building energy in the present disclosure, a power grid obtains a transaction harmony degree of a previous transaction cycle based on historical data stored by a building energy user in a blockchain, and sends the transaction harmony degree and maximum and expected compensated electricity prices in peak-valley regulation to the building energy user by using the blockchain. After receiving the above data from the power grid, the building energy user determines a transaction-based compensated electricity price in the peak-valley regulation, so that the power grid constructs a model of transaction matching between the power grid and the building energy user, dynamically updates a transaction harmony degree between the power grid and the building energy user based on real-time information update of the blockchain, and uses an updated transaction harmony degree of the building energy user as an importance basis for transaction matching in peak-valley regulation in a next transaction cycle. This realizes a smart, efficient, and transparent transaction process.

Figure 4:
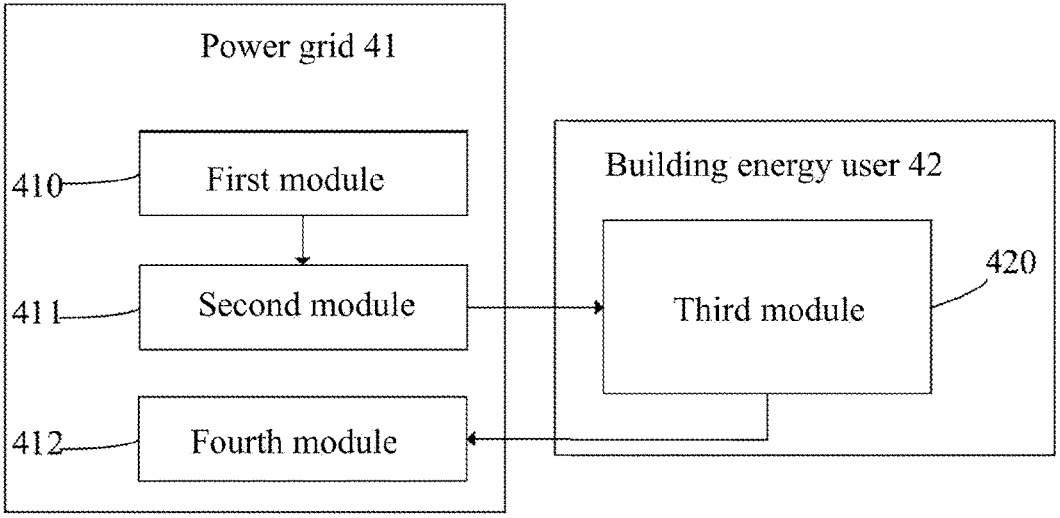
FIG. 4 is a schematic structural diagram of a transaction harmony degree-based system for transaction matching between a power grid and building energy according to the present disclosure.

FIG. 4 is a schematic structural diagram of a transaction harmony degree-based system for transaction matching between a power grid and building energy according to the present disclosure. As shown in FIG. 4, the system includes a power grid 41 and a building energy user 42.

The power grid 41 includes a first module 410, configured to obtain a transaction harmony degree of a historical transaction cycle based on data that is of the historical transaction cycle within a current transaction season and stored by the building energy user in a blockchain; and a second module 411, configured to send, by using the blockchain, the transaction harmony degree to the corresponding building energy user, and send a maximum compensated electricity price and an expected compensated electricity price in peak-valley regulation in a current transaction cycle to all building energy users 42.

The building energy user 42 includes a third module 420, configured to determine a transaction-based compensated electricity price in the peak-valley regulation in the current transaction cycle based on the received transaction harmony degree and the received maximum compensated electricity price and expected compensated electricity price in the peak-valley regulation in the current transaction cycle, and feed back the transaction-based compensated electricity price in the peak-valley regulation in the current transaction cycle to the power grid 41 by using the blockchain.

The power grid further includes a fourth module 412, configured to obtain, based on the transaction-based compensated electricity price in the peak-valley regulation in the current transaction cycle, an objective function required to construct a model of transaction matching between the power grid and the building energy user, and determine, based on the model of transaction matching between the power grid and the building energy user and a PSO algorithm, a building energy user 42 that successfully performs transaction matching with the power grid 41.

The objective function is determined with an objective of maximizing a transaction harmony degree between the power grid and the building energy user and minimizing a compensation cost in the peak-valley regulation of the power grid.

The model of transaction matching between power grid and the building energy user is composed of the objective function, a first constraint, and a second constraint.

The transaction harmony degree-based system for transaction matching between a power grid and building energy in the present disclosure uses a blockchain platform as a transaction core. Specifically, a first module 410 of a power grid 41 obtains a transaction harmony degree of a previous transaction cycle based on historical data stored by a building energy user in a blockchain, and a second module 411 sends the transaction harmony degree and maximum and expected compensated electricity prices in peak-valley regulation to the building energy user 42 by using the blockchain. After receiving the above data from the power grid, a third module 420 of the building energy user 42 determines a transaction-based compensated electricity price in the peak-valley regulation, so that a fourth module 412 of the power grid 41 constructs a model of transaction matching between the power grid and the building energy user, and carries out a peak-valley regulation transaction between the power grid and the building energy user. This can realize an efficient, fair, and transparent power transaction of the building energy user in response to a peak-valley regulation strategy of the power grid, and give full play to an ability of regulating various types of regulatory resources including building energy, to deal with changes of a load peak and valley of the power grid and ensure safe and economic operation of the power grid.

In this embodiment of the present disclosure, the first module 410, the second module 411, the third module 420, and the fourth module 412 each may be one or more processors or chips that each has a communication interface, can realize a communication protocol, and may further include a memory, a related interface and system transmission bus, and the like if necessary. The processor or chip executes program-related code to realize a corresponding function. Alternatively, the first module 410, the second module 411, and the fourth module 412 share an integrated chip or share devices such as a processor and a memory. The shared processor or chip executes program-related code to implement a corresponding function.

Figure 5:
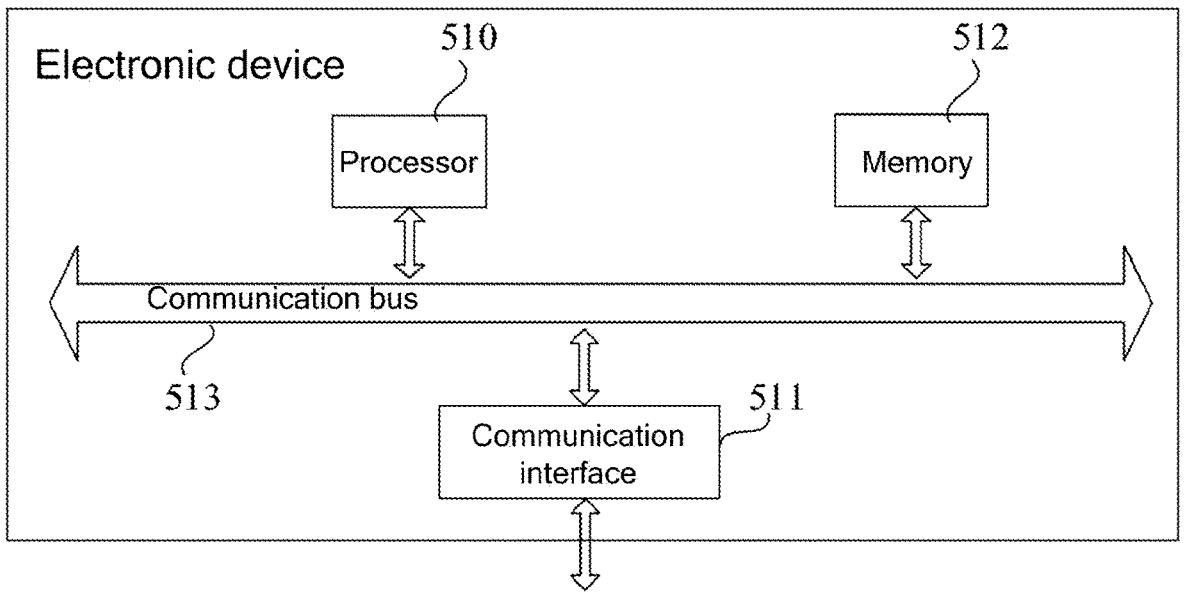
FIG. 5 is a schematic structural diagram of an electronic device according to the present disclosure.

FIG. 5 is a schematic diagram of a physical structure of an electronic device according to the present disclosure. As shown in FIG. 5, the electronic device may include a processor 510, a communication interface 511, a memory 512, and a bus 513, where the processor 510, the communication interface 511, and the memory 512 communicate with one another through the bus 513. The processor 510 may invoke a logic instruction in the memory 512 to execute a transaction harmony degree-based method for transaction matching between a power grid and building energy. The method includes:

obtaining, by a power grid, a transaction harmony degree of a historical transaction cycle based on data that is of the historical transaction cycle within a current transaction season and stored by a building energy user in a blockchain;

sending, by the power grid by using the blockchain, the transaction harmony degree to the corresponding building energy user, and sending a maximum compensated electricity price and an expected compensated electricity price in peak-valley regulation in a current transaction cycle to all building energy users;

determining, by each building energy user, a transaction-based compensated electricity price in the peak-valley regulation in the current transaction cycle based on the received transaction harmony degree and the received maximum compensated electricity price and expected compensated electricity price in the peak-valley regulation in the current transaction cycle, and feeding back the transaction-based compensated electricity price in the peak-valley regulation in the current transaction cycle to the power grid by using the blockchain; and obtaining, by the power grid based on the transaction-based compensated electricity price in the peak-valley regulation in the current transaction cycle, an objective function required to construct a model of transaction matching between the power grid and the building energy user, and determining, based on the model of transaction matching between the power grid and the building energy user and a PSO algorithm, a building energy user that successfully performs transaction matching with the power grid; where the objective function is determined with an objective of maximizing a transaction harmony degree between power grid and the building energy user and minimizing a compensation cost in the peak-valley regulation of the power grid; and the model of transaction matching between power grid and the building energy user is composed of the objective function, a first constraint, and a second constraint.

Besides, the logic instruction in the memory can be implemented as a software function unit and be stored in a computer-readable storage medium when sold or used as a separate product. Based on such understanding, the technical solutions of the present disclosure essentially or the part contributing to the prior art may be implemented in a form of a software product. The computer software product may be stored in a storage medium, and includes several instructions for enabling a computer device (which may be a personal computer, a server, a network device, or the like) to perform all or some steps of the methods described in the embodiments of the present disclosure. The aforementioned storage medium includes: a USB flash disk, a mobile hard disk, a read-only memory (ROM), a random access memory (RAM), a magnetic disk, an optical disc, or other media capable of storing program code.

Further, an embodiment of the present disclosure provides a computer program product. The computer program product includes a computer program stored on a non-transitory computer-readable storage medium. The computer program includes a program instruction. The program instruction is executed by a computer to perform the transaction harmony degree-based method for transaction matching between a power grid and building energy in the above method embodiments. The method includes:

obtaining, by a power grid, a transaction harmony degree of a historical transaction cycle based on data that is of the historical transaction cycle within a current transaction season and stored by a building energy user in a blockchain;

sending, by the power grid by using the blockchain, the transaction harmony degree to the corresponding building energy user, and sending a maximum compensated electricity price and an expected compensated electricity price in peak-valley regulation in a current transaction cycle to all building energy users;

determining, by each building energy user, a transaction-based compensated electricity price in the peak-valley regulation in the current transaction cycle based on the received transaction harmony degree and the received maximum compensated electricity price and expected compensated electricity price in the peak-valley regulation in the current transaction cycle, and feeding back the transaction-based compensated electricity price in the peak-valley regulation in the current transaction cycle to the power grid by using the blockchain; and obtaining, by the power grid based on the transaction-based compensated electricity price in the peak-valley regulation in the current transaction cycle, an objective function required to construct a model of transaction matching between the power grid and the building energy user, and determining, based on the model of transaction matching between the power grid and the building energy user and a PSO algorithm, a building energy user that successfully performs transaction matching with the power grid; where the objective function is determined with an objective of maximizing a transaction harmony degree between power grid and the building energy user and minimizing a compensation cost in the peak-valley regulation of the power grid; and the model of transaction matching between power grid and the building energy user is composed of the objective function, a first constraint, and a second constraint.

Further, an embodiment of the present disclosure provides a non-transitory computer-readable storage medium storing a computer program. The computer program is executed by a processor to perform the transaction harmony degree-based method for transaction matching between a power grid and building energy in the above method embodiments. The method includes:

obtaining, by a power grid, a transaction harmony degree of a historical transaction cycle based on data that is of the historical transaction cycle within a current transaction season and stored by a building energy user in a blockchain;

sending, by the power grid by using the blockchain, the transaction harmony degree to the corresponding building energy user, and sending a maximum compensated electricity price and an expected compensated electricity price in peak-valley regulation in a current transaction cycle to all building energy users;

determining, by each building energy user, a transaction-based compensated electricity price in the peak-valley regulation in the current transaction cycle based on the received transaction harmony degree and the received maximum compensated electricity price and expected compensated electricity price in the peak-valley regulation in the current transaction cycle, and feeding back the transaction-based compensated electricity price in the peak-valley regulation in the current transaction cycle to the power grid by using the blockchain; and obtaining, by the power grid based on the transaction-based compensated electricity price in the peak-valley regulation in the current transaction cycle, an objective function required to construct a model of transaction matching between the power grid and the building energy user, and determining, based on the model of transaction matching between the power grid and the building energy user and a PSO algorithm, a building energy user that successfully performs transaction matching with the power grid; where the objective function is determined with an objective of maximizing a transaction harmony degree between power grid and the building energy user and minimizing a compensation cost in the peak-valley regulation of the power grid; and the model of transaction matching between power grid and the building energy user is composed of the objective function, a first constraint, and a second constraint.

The system embodiment described above is merely schematic, where the unit described as a separate component may or may not be physically separated, and a component displayed as a unit may or may not be a physical unit, that is, the component may be located at one place, or distributed on a plurality of network units. Some or all of the modules may be selected based on actual needs to achieve the objectives of the solutions of the embodiments. Those of ordinary skill in the art can understand and implement the embodiments without creative efforts.

Through the description of the foregoing implementations, those skilled in the art can clearly understand that the implementations can be implemented by means of software plus a necessary universal hardware platform, or certainly, can be implemented by hardware. Based on such understanding, the technical solutions essentially or the part contributing to the prior art may be implemented in a form of a software product. The computer software product may be stored in a computer-readable storage medium such as a ROM/RAM, a magnetic disk, or an optical disk, and includes several instructions for enabling a computer device (which may be a personal computer, a server, a network device, or the like) to execute the methods in the embodiments or parts of the embodiments.

Finally, it should be noted that the foregoing embodiments are only used to illustrate the technical solutions of the present disclosure, and are not intended to limit the present disclosure. Although the present disclosure is described in detail with reference to the foregoing embodiments, those of ordinary skill in the art should understand that they can still modify the technical solutions described in the foregoing embodiments, or make equivalent substitutions to some technical features therein. These modifications or substitutions do not make the essence of the corresponding technical solutions depart from the spirit and scope of the technical solutions in the embodiments of the present disclosure.

The invention claimed is:

1. A transaction harmony degree-based method for transaction matching between a power grid and building energy, comprising:

obtaining, by a power grid, a transaction harmony degree of a historical transaction cycle based on data that is of the historical transaction cycle within a current transaction season and stored by a building energy user in a blockchain;

sending, by the power grid by using the blockchain, the transaction harmony degree to the corresponding building energy user, and sending a maximum compensated electricity price and an expected compensated electricity price in peak - valley regulation in a current transaction cycle to all building energy users;

determining, by each building energy user, a transaction-based compensated electricity price in the peak-valley regulation in the current transaction cycle based on the received transaction harmony degree and the received maximum compensated electricity price and expected compensated electricity price in the peak-valley regulation in the current transaction cycle, and feeding back the transaction-based compensated electricity price in the peak-valley regulation in the current transaction cycle to the power grid by using the blockchain; and obtaining, by the power grid based on the transaction-based compensated electricity price in the peak-valley regulation in the current transaction cycle, an objective function required to construct a model of transaction matching between the power grid and the building energy user, and determining, based on the model of transaction matching between the power grid and the building energy user and a particle swarm optimization (PSO) algorithm, a building energy user that successfully performs transaction matching with the power grid; wherein the objective function is determined with an objective of maximizing a transaction harmony degree between the power grid and the building energy user and minimizing a compensation cost in the peak-valley regulation of the power grid; and the model of transaction matching between the power grid and the building energy user is composed of the objective function, a first constraint, and a second constraint; wherein after the determining, based on the model of transaction matching between the power grid and the building energy user, a building energy user that successfully performs transaction matching with the power grid, the method further comprises:

determining, by the power grid, an agreed electricity quantity in peak regulation in the current transaction cycle and an agreed electricity quantity in valley regulation in the current transaction cycle based on the model of transaction matching between the power grid and the building energy user; and sending, by the power grid by using the blockchain, the agreed electricity quantity in the peak regulation in the current transaction cycle and the agreed electricity quantity in the valley regulation in the current transaction cycle to the building energy user with successful transaction matching.

2. The transaction harmony degree-based method for transaction matching between a power grid and building energy according to claim 1, wherein the obtaining, by a power grid, a transaction harmony degree of a historical transaction cycle based on data that is of the historical transaction cycle within a current transaction season and stored by a building energy user in a blockchain comprises:

obtaining, by the power grid, the transaction harmony degree based on formulas (1) to (7) and the data that is of the historical transaction cycle within the current transaction season and stored by the building energy user in the blockchain;

$$F_i^k = \sigma_a F_{i,a}^k + \sigma_b F_{i,b}^k + \sigma_c F_{i,c}^k + \sigma_d F_{i,d}^k \quad (1)$$

wherein $F_i^k$ represents the transaction harmony degree of the historical transaction cycle, i=1, 2, . . . , m, m represents a total quantity of building energy users participating in a transaction, k represents a quantity of transactions, namely, a transaction cycle number, $F_{i,a}^k$ represents an influencing factor of an achievement degree of an expected electricity quantity in the peak-valley regulation, $F_{i,b}^k$ represents an influencing factor of a satisfaction degree of a compensated electricity price in the peak-valley regulation, $F_{ic}^l$ represents an influencing factor of a transaction frequency, $F_{i,d}^k$ represents an influencing factor of a transaction achievement degree, and $\sigma_a$, $\sigma_b$, $\sigma_c$, and $\sigma_d$ represent importance degree coefficients of the influencing factors respectively;

$$F_{i,a}^k = \omega_1 F_{i,a1}^k + \omega_2 F_{i,a2}^k \quad (2)$$

$$F_{i,a1}^k = \sum_{j=1}^{k} \alpha^j \left( -\frac{|E_{g,i}^{peak,j} - D_{g,i}^{peak,j}|}{D_{g,i}^{peak,j}} + 1 \right) \text{ and} \quad (3)$$

$$E_{g,i}^{peak,j} > 2 D_{g,i}^{peak,j}, E_{g,i}^{peak,j} = 2 D_{g,i}^{peak,j}$$

$$F_{i,a2}^k = \sum_{j=1}^{k} \beta^j \left( -\frac{|E_{g,i}^{vall,j} - D_{g,i}^{vall,j}|}{D_{g,i}^{vall,j}} + 1 \right) \text{ and} \quad (4)$$

$$E_{g,i}^{vall,j} > 2 D_{g,i}^{vall,j}, E_{g,i}^{vall,j} = 2 D_{g,i}^{vall,j}$$

wherein $F_{i,a1}^k$ represents an influencing factor of an achievement degree of an expected peak electricity quantity after a $k^{th}$ transaction ends, $F_{i,a2}^k$ represents an influencing factor of an achievement degree of an expected electricity quantity in valley regulation after the $k^{th}$ transaction ends, $\omega_1$ represents an importance degree coefficient of an achievement degree of an expected electricity quantity in peak regulation, $\omega_2$ represents an importance degree coefficient of the achievement degree of the expected electricity quantity in the valley regulation, $E_{g,i}^{peak,j}$ represents an actual electricity quantity of a building energy user i in a $j^{th}$ round of peak regulation, $E_{g,i}^{vall,j}$ represents an actual electricity quantity of the building energy user i in a $j^{th}$ round of valley regulation, $D_{g,i}^{peak,j}$ represents an electricity quantity agreed between the power grid and the building energy user i in peak regulation in a $j^{th}$ transaction, $D_{g,i}^{vall,j}$ represents an electricity quantity agreed between the power grid and the D vall , j building energy user i in valley regulation in the $j^{th}$ transaction, and $\alpha^j$ and $\beta^j$ represent weight coefficients of the $j^{th}$ transaction in a current transaction season $\tau$;

$$F_{i,b}^k = \sum_{j=1}^{k} \gamma^j \frac{F_{b,h}^j - F_{i,b,r}^j}{F_{b,h}^j - F_{b,e}^j} \quad (5)$$

wherein $F_{i,b,r}^j$ represents a transaction-based compensated electricity price of the building energy user i in peak-valley regulation in the $j^{th}$ transaction, $F_{b,h}^j$ represents a maximum compensated electricity price in the peak-valley regulation in the $j^{th}$ transaction, $F_{b,e}^j$ represents an expected compensated electricity price in the peak-valley regulation in the $j^{th}$ transaction, and $Y^j$ represents a weight coefficient of the $j^{th}$ transaction;

$$F_{i,c}^k = \sum_{z=1}^{S_i^k - 1} \chi^z \frac{1}{t_{i,z+1} - t_{i,z}} \quad (6)$$

wherein $S_i^k$ represents a total quantity of successful transactions between the power grid and the building energy user i up to the end of the $k^{th}$ transaction in the current transaction season $\tau$, $\chi^z$ represents a weight coefficient of a $z^{th}$ transaction, $t_{i,z}$ represents a corresponding transaction cycle number when the power grid and the building energy user i achieve the $z^{th}$ transaction in the current transaction season $\tau$, and $t_{i,z+1}$ represents a corresponding transaction cycle number when the power grid and the building energy user i achieve a $(z+1)^{th}$ transaction in the current transaction season $\tau$; and $$F_{i,d}^k = \sum_{j=1}^{k} \rho^j \frac{S_i^j}{S_i^j + L_i^j} \quad (7)$$

wherein $S_i^j$ represents a total quantity of successful transactions between the power grid and the building energy user i up to the end of the $j^{th}$ transaction in the current transaction season $\tau$, $L_i^j$ represents a total quantity of agreement violations between the power grid and the building energy user i up to the end of the $j^{th}$ transaction in the current transaction season $\tau$, and $\rho^j$ represents a weight coefficient of the $j^{th}$ transaction.

3. The transaction harmony degree-based method for transaction matching between a power grid and building energy according to claim 1, wherein the objective function is obtained in the following manner:

obtaining, by the power grid based on the transaction harmony degree, the transaction-based compensated electricity price of each building energy user in the peak-valley regulation in the current transaction cycle, and a formula (8), the objective function $C_F$ with a maximum transaction harmony degree between the power grid and the building energy user and a minimum compensation cost in the peak-valley regulation of the power grid:

$$C_F = \begin{cases} \max \sum_{i=1}^{m} F_i^k h_{g,i}^{k+1} \\ \min \sum_{i=1}^{m} F_{i,b,r}^{k+1} (D_{g,i}^{peak,k+1} + D_{g,i}^{vall,k+1}) h_{g,i}^{k+1} \end{cases} \quad (8)$$

wherein $F_{i,b,r}^{k+1}$ represents a transaction-based compensated electricity price in peak-valley regulation in a $k+1^{th}$ transaction between the power grid and a building energy user i, $D_{g,i}^{peak,k+1}$ represents an electricity quantity agreed between the power grid and the building energy user i in peak regulation in a $k+1^{th}$ transaction cycle, $D_{g,i}^{vall,k+1}$ represents an electricity quantity agreed between the power grid and the building energy user i in valley regulation in the $k+1^{th}$ transaction cycle, and $h_{g,i}^{k+1}$ represents whether the $k+1^{th}$ transaction is conducted between the power grid and the building energy user i.

4. The transaction harmony degree-based method for transaction matching between a power grid and building energy according to claim 1, wherein the first constraint is obtained in the following manner:

receiving an electricity quantity margin range in peak regulation in the current transaction cycle, an electricity quantity margin range in valley regulation in the current transaction cycle, and the transaction-based compensated electricity price in the peak-valley regulation that are fed back by each building energy user by using the blockchain, and obtaining, based on formulas (9) to (11), the first constraint of the model of transaction matching between the power grid and the building energy user:

$$F_{b,e}^{k+1} \leq F_{i,b,r}^{k+1} \leq F_{b,h}^{k+1} \qquad (9)$$

$$D_{i,min}^{peak,k+1} \leq D_{g,i}^{peak,k+1} \leq D_{i,max}^{peak,k+1} \qquad (10)$$

$$D_{i,min}^{vall,k+1} \leq D_{g,i}^{vall,k+1} \leq D_{i,max}^{vall,k+1} \qquad (11)$$

wherein $F_{b,e}^{k+1}$ and $F_{b,h}^{k+1}$ respectively represent an expected compensated electricity price and a maximum compensated electricity price in peak-valley regulation that are sent by the power grid to all the building energy users by using the blockchain in a $k+1^{th}$ transaction cycle, $F_{i,b,r}^{k+1}$ represents a transaction-based compensated electricity price of a building energy user i in the peak-valley regulation in the $k+1^{th}$ transaction cycle, $D_{g,i}^{peak,k+1}$ represents an electricity quantity agreed between the power grid and the building energy user i in peak regulation in the $k+1^{th}$ transaction cycle, $D_{g,i}^{vall,k+1}$ represents an electricity quantity agreed between the power grid and the building energy user i in valley regulation in the $k+1^{th}$ transaction cycle, $D_{i,max}^{peak,k+1}$ represents a maximum electricity quantity of the building energy user i in the peak regulation in the $k+1^{th}$ transaction cycle, $D_{i,min}^{vall,k+1}$ represents a minimum electricity quantity of the building energy user i in the peak regulation in the $k+1^{th}$ transaction cycle, $D_{i,max}^{vall,k+1}$ represents a maximum electricity quantity of the building energy user i in the valley regulation in the $k+1^{th}$ transaction cycle, and $D_{i,min}^{vall,k+1}$ represents a minimum electricity quantity of the building energy user i in the valley regulation in the $k+1^{th}$ transaction cycle.

5. The transaction harmony degree-based method for transaction matching between a power grid and building energy according to claim 1, wherein the second constraint is obtained in the following manner:

obtaining, by the power grid based on an expected total electricity quantity requirement in the peak-valley regulation in the current transaction cycle and formulas (12) to (14), the second constraint of the model of transaction matching between the power grid and the building energy user:

$$\left| D_g^{peak,k+1} - \sum_{i=1}^{m} D_{g,i}^{peak,k+1} h_{g,i}^{k+1} \right| \leq \varepsilon_g^{peak,k+1} \qquad (12)$$

$$\left| D_g^{vall,k+1} - \sum_{i=1}^{m} D_{g,i}^{vall,k+1} h_{g,i}^{k+1} \right| \leq \varepsilon_g^{vall,k+1} \qquad (13)$$

$$h_{g,i}^{k+1} = 0, 1 \qquad (14)$$

wherein $D_g^{peak,k+1}$ represents an expected total electricity quantity requirement in peak regulation, $D_g^{vall,k+1}$ represents an expected total electricity quantity requirement in valley regulation, $\varepsilon_g^{peak,k+1}$ represents an allowable deviation, preset by the power grid in a $k+1^{th}$ transaction cycle, between the expected total electricity quantity requirement in the peak regulation and a total electricity quantity actually agreed in the peak regulation, $\varepsilon_g^{vall,k+1}$ represents an allowable deviation, preset by the power grid in the $k+1^{th}$ transaction cycle, between the expected total electricity quantity requirement in the valley regulation and a total electricity quantity actually agreed in the valley regulation, $h_{g,i}^{k+1}$ represents whether a $k+1^{th}$ transaction is conducted between the power grid and a building energy user i, and is also a variable on which optimization solution is to be performed in the transaction matching model, $h_{g,i}^{k+1}=0$ represents that the transaction is not conducted between the power grid and the building energy user, and $h_{g,i}^{k+1}=1$ represents that the transaction is conducted between the power grid and the building energy user.

6. The transaction harmony degree-based method for transaction matching between a power grid and building energy according to claim 1, wherein after the sending, by the power grid by using the blockchain, the agreed electricity quantity in the peak regulation in the current transaction cycle and the agreed electricity quantity in the valley regulation in the current transaction cycle to the building energy user with successful transaction matching, the method further comprises:

determining, by the building energy user with successful transaction matching, an actual electricity quantity in the peak regulation and an actual electricity quantity in the valley regulation based on the received agreed electricity quantity in the peak regulation in the current transaction cycle and the received agreed electricity quantity in the valley regulation in the current transaction cycle; and refusing, by the building energy user with successful transaction matching, to perform transaction matching with the power grid if determining that the compensation cost, obtained through transaction matching with the power grid, in the peak-valley regulation of the power grid is lower than a preset value.

7. A transaction harmony degree-based system for transaction matching between a power grid and building energy, comprising a power grid and a building energy user, wherein the power grid comprises a first module, configured to obtain a transaction harmony degree of a historical transaction cycle based on data that is of the historical transaction cycle within a current transaction season and stored by a building energy user in a blockchain; and a second module, configured to send, by using the blockchain, the transaction harmony degree to the corresponding building energy user, and send a maximum compensated electricity price and an expected compensated electricity price in peak - valley regulation in a current transaction cycle to all building energy users;

the building energy user comprises a third module, configured to determine a transaction-based compensated electricity price in the peak-valley regulation in the current transaction cycle based on the received transaction harmony degree and the received maximum compensated electricity price and expected compensated electricity price in the peak-valley regulation in the current transaction cycle, and feed back the transaction-based compensated electricity price in the peak-valley regulation in the current transaction cycle to the power grid by using the blockchain; and the power grid further comprises a fourth module, configured to obtain, based on the transaction-based compensated electricity price in the peak-valley regulation in the current transaction cycle, an objective function required to construct a model of transaction matching between the power grid and the building energy user, and determine, based on the model of transaction matching between the power grid and the building energy user and a PSO algorithm, a building energy user that successfully performs transaction matching with the power grid; wherein the objective function is determined with an objective of maximizing a transaction harmony degree between the power grid and the building energy user and minimizing a compensation cost in the peak-valley regulation of the power grid; and the model of transaction matching between the power grid and the building energy user is composed of the objective function, a first constraint, and a second constraint; wherein:

after the fourth module determines, based on the model of transaction matching between the power grid and a building energy user that successfully performs transaction matching with the power grid, the power grid further:

determines an agreed electricity quantity in peak regulation in the current transaction cycle and an agreed electricity quantity in valley regulation in the current transaction cycle based on the model of transaction matching between the power grid and the building energy user; and sends, by the power grid by using the blockchain, the agreed electricity quantity in the peak regulation in the current transaction cycle and the agreed electricity quantity in the valley regulation in the current transaction cycle to the building energy user with successful transaction matching.

8. An electronic device, comprising a memory, a processor, and a computer program stored in the memory and able to run on the processor, wherein the processor executes the program to perform steps of the transaction harmony degree-based method for transaction matching between a power grid and building energy according to claim 1.

9. A non-transitory computer-readable storage medium storing a computer program, wherein the computer program is executed by a processor to perform steps of the transaction harmony degree-based method for transaction matching between a power grid and building energy according to claim 1.

* * * * *